(12) United States Patent
Sugita (10) Patent No.: US 7,930,001 B2
(45) Date of Patent: Apr. 19, 2011

(54) INFORMATION PROCESSING APPARATUS AND CELLULAR PHONE

(75) Inventor: Shigeru Sugita, Mitaka (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 582 days.

(21) Appl. No.: 12/074,313

(22) Filed: Mar. 3, 2008

(65) Prior Publication Data

US 2008/0235529 A1    Sep. 25, 2008

(30) Foreign Application Priority Data

Mar. 22, 2007   (JP) ................ P2007-075411

(51) Int. Cl.
*H04B 1/38* (2006.01)
(52) U.S. Cl. ............ 455/574; 455/572; 455/343.1; 455/343.4; 713/320; 370/311
(58) Field of Classification Search ........... 455/574, 455/572, 343.1–343.4; 713/320–324; 370/311, 370/318

See application file for complete search history.

(56) References Cited

U.S. PATENT DOCUMENTS

| | | | | |
|---|---|---|---|---|
| 5,828,568 A * | 10/1998 | Sunakawa et al. | | 713/320 |
| 6,052,791 A * | 4/2000 | Chen et al. | | 713/300 |
| 6,201,966 B1 * | 3/2001 | Rinne et al. | | 455/434 |
| 6,278,887 B1 * | 8/2001 | Son et al. | | 455/566 |
| 6,639,907 B2 * | 10/2003 | Neufeld et al. | | 455/574 |
| 7,289,832 B1 * | 10/2007 | Enoki et al. | | 455/574 |
| 2005/0210206 A1 * | 9/2005 | Woodbridge et al. | | 711/154 |

FOREIGN PATENT DOCUMENTS

JP    2006-164203 A    6/2006

* cited by examiner

*Primary Examiner* — Kamran Afshar
*Assistant Examiner* — Thai Vu
(74) *Attorney, Agent, or Firm* — Maschoff Gilmore & Israelsen (57) ABSTRACT

According to an aspect of the invention, there is provided an information processing apparatus including: a control unit configured to allow a device to perform an operation consuming a first amount of electrical power when the processing unit uses the device and allow the device to perform an operation consuming a second amount of electrical power less than the first amount of electrical power when the device is not used for a predetermined period of time after the device use, the control unit configured to determine the predetermined period of time in accordance with a request of the processing unit; and a plurality of processing units configured to use the device and request a length of the predetermined period of time to the control unit.

13 Claims, 4 Drawing Sheets

| LONGEST STANDBY TIME | PRIORITY | WEIGHT | PROCESSING UNIT INFORMATION |
|---|---|---|---|
| 0 SECOND | 3 | 1 | — |
| 5 SECONDS (IMPLICIT VALUE) | 2 | 3 | STATIONARY IMAGE VIEWER |
| 10 SECONDS | 1 | 2 | CONTENTS PLAYER (FAST FORWARD) |
| | | | |

11b MODE MANAGEMENT TABLE
11c  11d  11e  11f

11b MODE MANAGEMENT TABLE

| LONGEST STANDBY TIME (11c) | PRIORITY (11d) | WEIGHT (11e) | PROCESSING UNIT INFORMATION (11f) |
|---|---|---|---|
| 0 SECOND | 3 | 1 | CONTENTS PLAYER (PLAY) |
| 5 SECONDS (IMPLICIT VALUE) | 2 | 3 | — |
| 10 SECONDS | 1 | 2 | — |
|  |  |  |  |

FIG. 3

11b MODE MANAGEMENT TABLE

| LONGEST STANDBY TIME (11c) | PRIORITY (11d) | WEIGHT (11e) | PROCESSING UNIT INFORMATION (11f) |
|---|---|---|---|
| 0 SECOND | 3 | 1 | CONTENTS PLAYER (PLAY) |
| 5 SECONDS (IMPLICIT VALUE) | 2 | 3 | STATIONARY IMAGE VIEWER |
| 10 SECONDS | 1 | 2 | — |
|  |  |  |  |

FIG. 4

11b MODE MANAGEMENT TABLE

| LONGEST STANDBY TIME (11c) | PRIORITY (11d) | WEIGHT (11e) | PROCESSING UNIT INFORMATION (11f) |
|---|---|---|---|
| 0 SECOND | 3 | 1 | — |
| 5 SECONDS (IMPLICIT VALUE) | 2 | 3 | STATIONARY IMAGE VIEWER |
| 10 SECONDS | 1 | 2 | CONTENTS PLAYER (FAST FORWARD) |
|  |  |  |  |

INFORMATION PROCESSING APPARATUS AND CELLULAR PHONE

CROSS-REFERENCE TO RELATED APPLICATIONS

This application is based on and claims the benefit of priority from the prior Japanese Patent Application No. 2007-075411, filed on Mar. 22, 2007; the entire contents of which are incorporated herein by reference.

BACKGROUND

1. Technical Field

The present invention relates to an information processing apparatus, and particularly to reduction in electrical power consumed to operate the information processing apparatus.

2. Description of Related Art

A process of reducing electrical power consumed to operate an information processing apparatus is known. As the process, changing an operation clock of each device equipped in an apparatus, changing an operation voltage, changing display brightness, and stopping power supply, etc. are exemplified. Such processes are especially important in an apparatus such as a cellular phone and a portable computer which is operated by an electrical power supplied by a battery. The device include, for example, a main storage unit, an external storage medium connecting unit, an external storage medium, a display such as LCD, a backlight of a display or an input device configured by a plurality of keys, a communication unit, a camera, an image and/or voice processing unit for performing encoding or decoding, a voice amplifying unit, and a CPU. Each of the devices performs a process of reducing power consumption integrally or individually.

The reduction in the power consumption enables a battery to be used longer until battery charge or battery exchange.

When an amount of electrical power stored in a battery is less than a predetermined threshold value, the process of reducing the power consumption is performed or a process of further reducing power consumption is performed.

However, when an operation is restored to a normal operation during use of the device in which the process of reducing the power consumption is performed, the device cannot be immediately used or the performance thereof cannot be immediately restored. Consequently, response of the apparatus may be inconvenient for a user. Moreover, since the electrical power consumed in an operation for restoration is not an electrical power used in a normal operation, the consumed electrical power may be wasteful. As a result, in such a circumstance, determination whether to perform reduction in the power consumption is important.

In a case where a device of the apparatus is not used, it is effective not to supply electrical power to the device in terms of reduction in the power consumption, but the above-described may occur. For example, in order to access to an external storage medium in which power supply is being stopped, a process of reading information inherent to the medium stored in the external storage medium and an authentication process require time. Moreover, if the external storage medium is a disc such as an HDD, a CD, or a DVD, it is necessary to have a predetermined time until re-rotation of the disc medium at a predetermined speed.

JP-A-2006-164203 teaches a process of suppressing deterioration of the response of the apparatus and reducing the power consumption by storing the information stored in the disc medium to a storage unit of the apparatus before reduction in the power consumption, and operating the apparatus on the basis of the information stored in the storage unit of the apparatus as much as possible.

However, a method disclosed in JP-A-2006-164203 does not give a solution to the user operability since the response of the apparatus deteriorates if the information stored in the storage unit of the apparatus cannot operate the apparatus. For example, suppose that the storage medium is an SD card and the authentication process is necessary before the operation of the storage medium, a problem may also arise in that the reduction in the time for the authentication process is not possible.

SUMMARY

According to an aspect of the invention, there is provided an information processing apparatus including: a battery; a first module configured to operate based on the electrical power supplied from the battery; a second module configured to access the first module to execute processing; a memory configured to store a table containing standby time and information identifying the second module; and a controller configured to control power supply to the first module. The controller terminates the power supply to the first module if the controller fails to detect access to the first module from the second module and the standby time has elapsed from a previous access.

DESCRIPTION OF THE EMBODIMENTS

Figure 1:
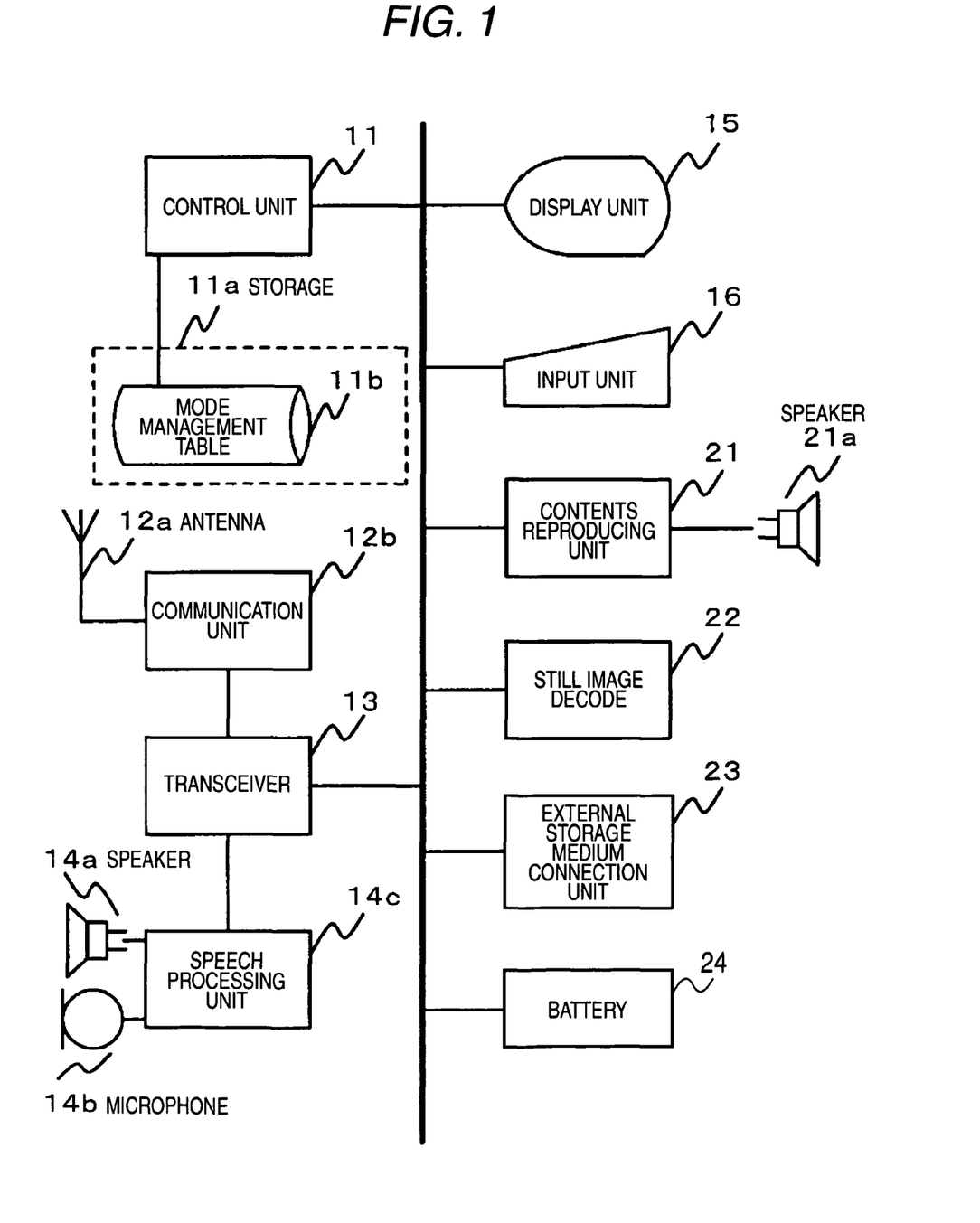
FIG. 1 is an exemplary block diagram illustrating a configuration of a telecommunication terminal according to the embodiment of the invention.

Hereinafter, an information processing apparatus according an embodiment of the invention will be described with reference to the drawings. FIG. 1 is a block diagram illustrating a configuration of a cellular phone as an example of the information processing apparatus relating to the invention.

The cellular phone includes a control unit 11 for controlling an entire apparatus, a storage unit 11a, an antenna 12a for transmitting and receiving radio signal between the cellular telephone and a base station (not shown), a communication unit 12b, a transceiver 13, a speaker 14a, a microphone 14b, a speech processing unit 14c such as a speech codec, a display unit 15, an input unit 16 which contains a plurality of keys for inputting alphanumerical information and instruction, a contents reproducing unit 21, a speaker 21a for generating a voice reproduced by the contents reproducing unit 21, a still image decoder 22, an external storage medium connection unit 23, and battery 24 for supplying electrical power to a plurality of unit in the cellular phone.

An external storage medium (not shown) is detachably connected to the external storage medium connection unit 23. The external storage medium such as a memory card has a copyright management function of information stored in the external storage medium. However, the external storage medium is not limited to the memory card. Hereinafter, the external storage medium connected to the external storage medium connection unit 23 is simply referred to as an external storage medium.

A mode management table 11b is stored in the storage unit 11a. As described in detail below, a device which is a power consumption reduction target is not supplied with electrical power from a battery 24 under the control of the control unit 11 when the device is not used for a predetermined period of time (hereinafter, referred to as the longest standby time) from use end of the device. The mode management table 11b shows how long the longest standby time requested by the processing unit using the device is.

An operation of each element of the information processing apparatus according to the embodiment will be described with reference to FIG. 1.

The control unit 11 controls each element of the cellular phone and performs a power consumption reduction process of each element of the cellular phone. That is, in this embodiment, processing units are the contents reproducing unit 21 and the still image decoder 22 in this embodiment, and use the external storage medium connection unit 23 and the external storage medium. Here, the external storage medium connection unit 23 and the external storage medium are referred to as the external storage portion which is the power consumption reduction target. The control unit 11 stores information indicating the processing unit and standby time in the mode management table 11b. In addition, the control unit 11 allows the longest standby time related to the power consumption reduction process of the external storage portion to be stored in the mode management table 11b.

The control unit 11 controls supplying electrical power to the external storage portion when the processing unit requests use of the external storage portion while the power supply to the external storage portion are being stopped. In addition, if a period of time the external storage portion is not used exceeds the longest standby time determined by the control unit 11 while the electrical power is supplied to the external storage portion, the power supply to the external storage portion is stopped.

The control unit 11 determines the longest standby time in accordance with the request of the used processing unit. At this time, the longest standby time determined by the control unit 11 may be either equal to or different from one of the longest standby time requested by the processing unit. In addition, the control unit 11 monitors whether the electrical power is supplied to the external storage portion and whether the external storage portion is used. On the basis of the circumstances, the longest standby time is determined.

The communication unit 12b outputs a high-frequency signal received by the antenna 12a to the transceiver 13 and transmits the high-frequency signal output from the transceiver 13 through the antenna 12a.

The transceiver 13 performs amplification of the high-frequency signal from the communication unit 12b and frequency modulation and demodulation. In addition, the transceiver transmits the obtained digital voice signal to the speech processing unit 14c and also transmits a control signal to the control unit 11. Furthermore, the transceiver performs modulation of the digital voice signal output from the speech processing unit 14c and the control signal output from the control unit 11 and performs frequency modulation and amplification to obtain the high-frequency signal and transmit the communication unit 12b.

The speech processing unit 14c modulates the digital voice signal output from the transceiver 13 into an analog voice signal and amplifies the analog voice signal to transmit it to the speaker 14a. In addition, the speech processing unit 14c amplifies the analog voice signal output from the microphone 14b and modulates the amplified analog voice signal into a digital voice signal to transmit it to the transceiver 13.

The display unit 15 displays image data containing characters, numerals, and cursors under the control of the control unit 11. In addition, the displayed data are switched in accordance with an instruction of the control unit 11 in response to an input operation from the input unit 16 or interruption of an incoming call signal.

The input unit 16 is configured by a plurality of function keys such as numeral keys for inputting a telephone number to be called and inputting Hiragana characters, alphabetic characters, sign characters by a toggle type input method, cursor movement keys, scroll keys, and function keys for inputting instructions.

When the keys of the input unit 16 are pressed, an identifier of the key is notified to the control unit 11. Characters are displayed on the display unit 15 by a process of each unit of the information processing apparatus to which the identifier is notified on the basis of control of the control unit 11, or the control is performed by pressing and un-pressing keys.

The contents reproducing unit 21 reproduces an encoded image contents stored in the external storage medium. That is, the contents reproducing unit 21 reads and decodes the encoded image contents to obtain an image signal and display on the display unit 15 and generates the obtained voice signal through the speaker 21a. In addition, the contents reproducing unit 21 fast-forwards and fast rewinds the image contents (fast forward in a direction opposite a reproduction direction). That is, an image signal made by reading and thinning out the image contents is displayed on the display unit 15. Moreover, the image contents may be contents containing no voice signal. In addition, the content may be music contents composed of an audio signal.

The still image decoder 22 allows information such as a file name of a still image or a thumbnail image of the still image of the still image for identifying the encoded still image stored in the external storage medium to be displayed on the display unit 15. In addition, the still image selected by a predetermined key operation of the input unit 16 is displayed on the display unit 15.

Hereinafter, a power consumption reduction process in the cellular phone according this embodiment will be described.

Figure 2:
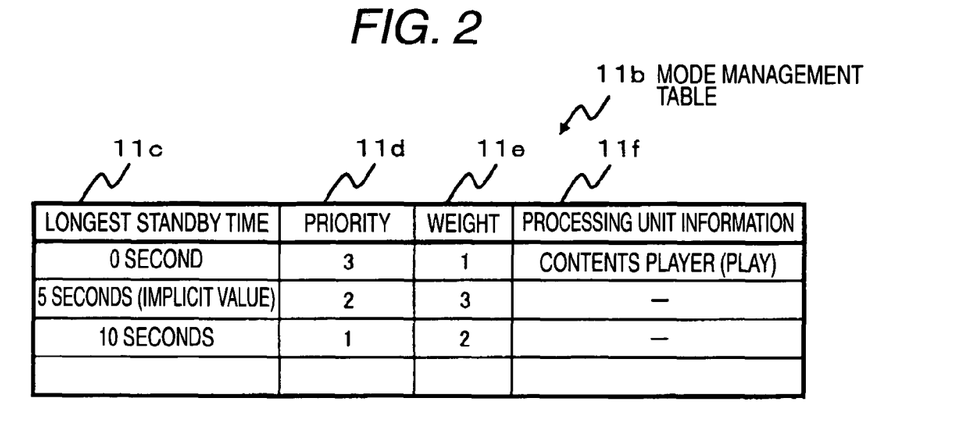
FIG. 2 is an exemplary diagram illustrating a first example of a processing-unit request status stored in a processing-unit request status storing unit according to the embodiment.

FIG. 2 is a diagram illustrating an example of the mode management table 11b stored in the storage unit 11a. The mode management table 11b is configured by information associated with a longest standby time 11c, a priority 11d, a weight 11e, and processing unit information 11f. The mode management table 11b is provided every device, which is the power consumption reduction target. Alternatively, the processing-unit request status can contain information associated with the information of identifying the device, which is the power consumption reduction target. In the embodiment, however, since the device which is the power consumption reduction target is just the external storage portion, a process of reducing power consumption of the external storage portion will be described.

In FIG. 2, the longest standby time 11c, the priority 11d, the weight 11e, and processing unit information 11f are arranged as if a plurality of the information associated with each other are adjacent. However, the reason they are illustrated in this manner is to facilitate understanding, and thus the invention is not limited thereto when they are stored. The mode management table 11b is not stored in the storage unit 11a, but may be stored in the control unit 11. In this case, a part of information may be in a program so as to be stored.

The longest standby time 11c illustrates an example of a period of time when the electrical power of the external storage portion is cut in a case where a non-operation period of time after the power supply to the external storage portion is equal to or more than the longest standby time 11c at a unit of 0 or the number of seconds. In addition, the mode management table 11b shown in FIG. 2 contains a plurality of the longest standby times 11c.

One of the plural longest standby times 11c is used as an implicit value. In FIG. 2, an example in which 5 seconds is used as the implicit value. The longest standby time used in the power consumption reduction process of the cellular phone is one of the plurality of longest standby times 11c or time different from the entire thereof, as described below.

The priority 11d is a priority of the longest standby time 11c. The priority is a natural number used to determine which longest standby time 11c is used in the power consumption reduction process and a smaller number indicates a higher priority. The weight 11e is a weight of the longest standby time 11c. The weight is used to determine which longest standby time 11c is used in the power consumption reduction process. The processing unit information 11f is one or a plurality of processing unit using the external storage portion and is information for identifying a processing unit requesting the power consumption reduction process by using the longest standby time 11c. In the processing unit information 11f, information showing use form of the external storage portion corresponding to the processing unit may be contained.

An example of the mode management table 11b illustrated in FIG. 2 shows that the contents reproducing unit 21 uses the external storage portion in order to perform a contents reproduction and requests the longest standby time of 0 second.

Figure 3:
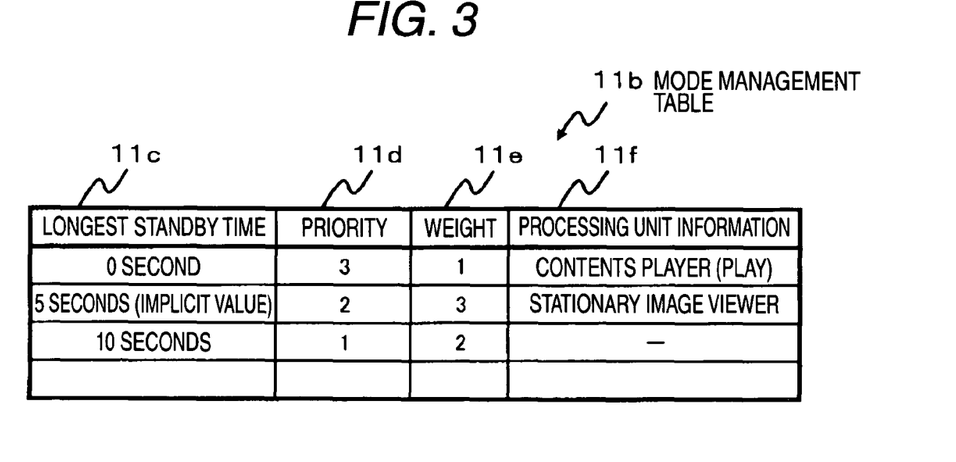
FIG. 3 is an exemplary diagram illustrating a second example of the processing-unit request status stored in the processing-unit request status storing unit according to the embodiment.

Another example of the mode management table 11b illustrated in FIG. 3 shows that the contents reproducing unit 21 uses the external storage portion in order to perform the contents reproduction and requests the longest standby time of 0 second, and shows that the still image viewer 22 uses the external storage portion and requests the longest standby time of 5 seconds or the implicit value.

Figure 4:
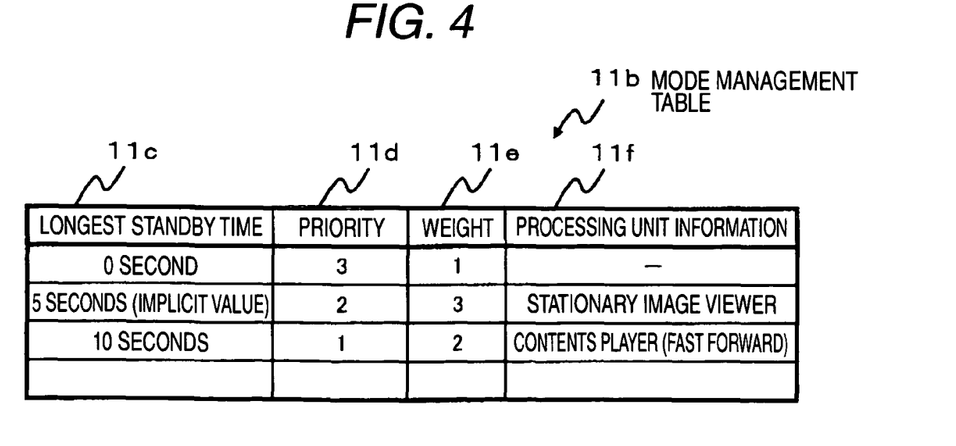
FIG. 4 is an exemplary diagram illustrating a third example of the processing-unit request status stored in the processing-unit request status storing unit according to the embodiment.

Still another example of the mode management table 11b illustrated in FIG. 4 shows that the still image decoder 22 uses the external storage portion and request the longest standby time of 5 seconds or the implicit value, and shows that the contents reproducing unit 21 uses the external storage portion in order to perform fast forward operation of contents and requests the longest standby time of 10 seconds.

The contents reproducing unit 21, which is started by a predetermined key operation of the input unit 16, reproduces contents stored in the designated external storage medium by operating one of a reproduction, a fast forward, and a rewind in accordance with the predetermined key operation of the input unit 16. In addition, in order to operate one of the reproduction, the fast forward, and the rewind, the contents reproducing unit 21 requests the control unit 11 to use the external storage portion and requests the longest standby time of 0, 5, or 10 seconds. In this case, in the contents reproducing unit 21, the requested longest standby time is dealt with in the same manner in use form of the fast forward and the rewind.

Next, the content reproducing unit 21 reads the designated contents from the external storage medium to operate each of the reproduction, the fast forward, and the rewind. The contents player 21 terminates the operation by performing a predetermined key operation of the input unit 16. In addition, when the use is terminated, the use termination of the external storage portion is notified to the control unit 11.

The longest standby time requested by the contents reproducing unit 21 is necessary because of the following reason. That is, the contents reproducing unit 21 has a buffer storage for storing contents in the inside of the contents reproducing unit 21. In addition, in operating the reproduction, the contents may be read sequentially. Accordingly, when reading the contents from the external storage medium, the contents reproducing unit 21 once reads a large amount of some contents into the buffer storage. Then, even when the power supply to the external storage portion is immediately cut, there is no trouble.

Even when stop of the power supply to the external storage portion is controlled upon terminating the read contents reproduction, the contents reproduction unit 21 can read contents to be continuously played without waiting the termination of the read contents. Consequently, there is no trouble in performing the reproduction. For this reason, the longest standby time is set to 0 second. That is, even when the power consumption reduction process of stopping the power supply to the external storage portion is performed, there is no trouble.

In operating the fast forward and the rewind, the contents reproducing unit 21 thins out the contents read from the external storage medium to display them on the display unit 15. Consequently, a large amount of information cannot be read to the buffer storage. Moreover, a user of the contents reproducing unit 21 can stop this operation, and then confirms an image display on the display unit 15 for some time until a predetermined image is displayed by operating the fast forward and the rewind. In addition, there is a probability of again instructing the fast forward or the rewind when the predetermined image is not displayed.

As a result, the contents reproducing unit 21 starts to again operate the fast forward or the rewind and again reads the contents from the external storage medium. When the power supply to the external storage portion has stopped in the reading, response of the information processing apparatus may deteriorate, thereby having a bad effect on user operability. In order to prevent generation of such a bad effect, the contents player 21 stops reading the contents from the external storage medium to operate the fast forward and the rewind, and then the power supply to the external storage portion has to continue for a long time.

The still image decoder 22 first starts an operation by a predetermined key operation of the input unit 16, uses the external storage portion, and then requests the control unit 11 so as to set the longest standby time to 5 seconds. Moreover, the still image decoder 22 displays identification information such as a file name of a stationary image or a thumbnail image of a still image of an encoded still image stored in the external storage medium on the display unit 15.

The still image decoder 22 displays a still image selected by the predetermined key operation of the input unit 16 on the display unit 15. The still image decoder 22 terminates an operation by performing the predetermined key operation of the input unit 16. Moreover, when terminating the use, the still image decoder 22 notifies the control unit 11 that it terminates the use of the external storage portion.

The longest standby time requested by the still image decoder 22 is necessary because of the following reason. That is, since the still image decoder 22 displays the still image selected in accordance with the predetermined key operation of the input unit 16 on the display unit 15, it is not possible to estimate that the still image stored in the external storage medium is read in which sequence and at which interval of time.

Consequently, by immediately displaying the till image which has been selected in accordance with the predetermined key operation of the input unit 16 by the user, the still image decoder 22 is required to continuously supply electrical power to the external storage portion for a long time after stopping the reading from the external storage medium in order to reduce the probability of having a bad effect on the user operability. That is, it is necessary to request the long longest standby time.

Meanwhile, the user may pay attention to the displayed still image for a long time. In this case, even though the power supply to the external storage portion is immediately discontinued to perform the power consumption reduction process, there is no trouble. Consequently, the still image decoder 22 has to stop the power supply to the external storage portion in a short time after the reading from the external storage medium is stopped. That is, it is necessary to request a short longest standby time. Eventually, an average longest standby time is required.

When the still image decoder 22 selects the still images in a predetermined sequence and repeats an operation (slide show) to display the still images on the display unit 15 for a predetermined period of time, the still image decoder 22 reads the selected still images from the external storage medium and can store them to the buffer storage of the still image decoder 22.

In reading these still images, the invention is not limited to such a sequential reading. However, since it is possible to estimate which still image is necessary in advance, the still image decoder 22 reads a large amount of information to the buffer storage. In addition, the still image decoder 22 determines that it immediately stops the power supply to the external storage portion to perform the power consumption reduction process, and requests the control unit 11 to set the longest standby time to 0 second.

Figure 5:
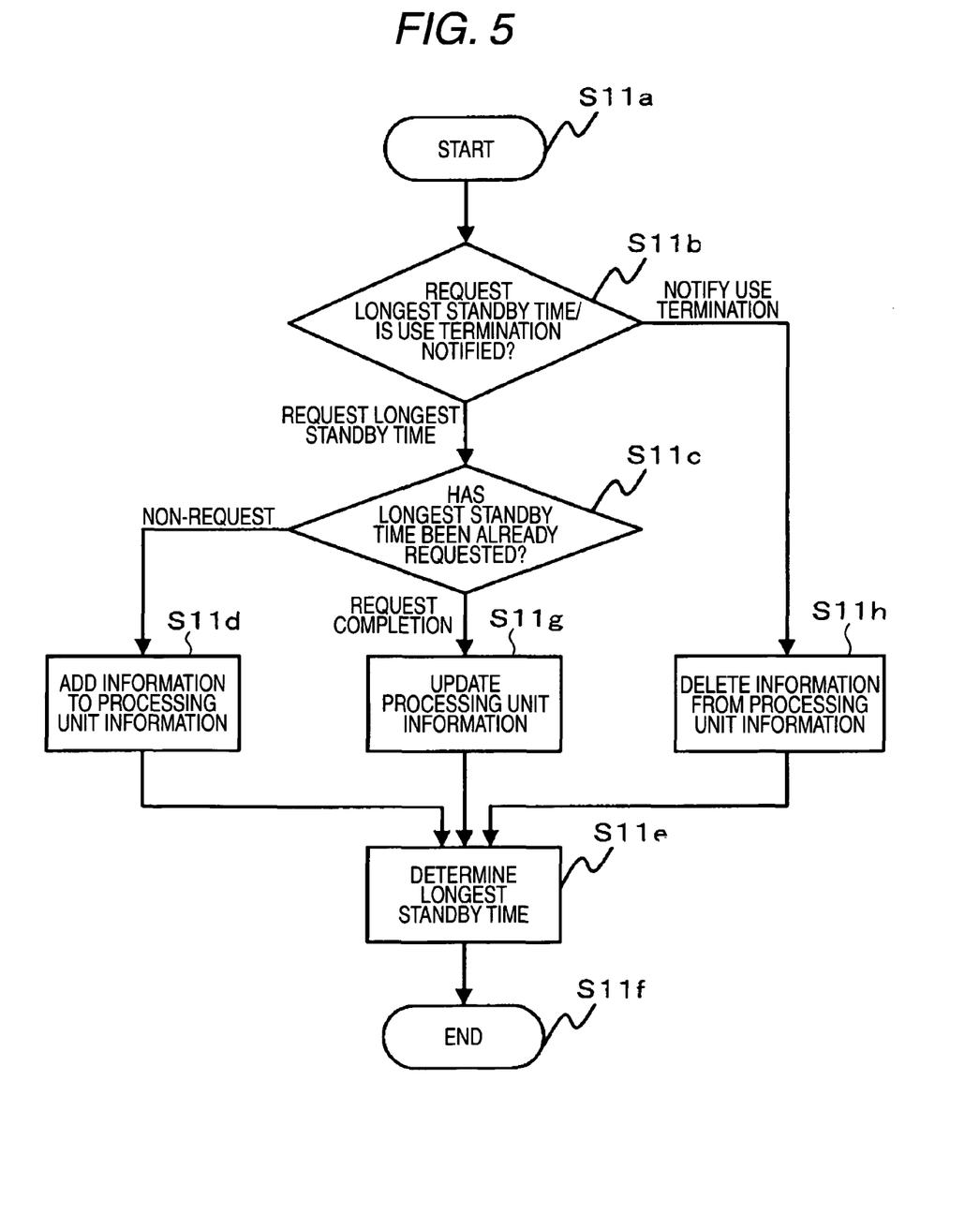
FIG. 5 is an exemplary flowchart showing an operation in which the control unit determines a longest standby time according to the embodiment.

Next, an operation in which the control unit 11 determines the longest standby time, receives a request for the longest standby time by the processing unit using the external storage portion, and receives a notification of terminating use of the external storage portion will be described. FIG. 5 is a flowchart showing an operation in which the control unit 11 receiving the request and the notification determines the longest standby time.

The control unit 11 receives a request for the longest standby time or a notification for use termination to start an operation (step S11$a$), and determines whether the request for the longest standby time is received or the notification for the use termination is received (step S11$b$). When determining that the request for the longest standby time has been received, the control unit determines whether the processing unit which transmits the request is the processing unit which has requested the longest standby time in advance or not on the basis of the fact that the processing unit which requests the longest standby time is contained in the processing unit information 11$f$ in the mode management table 11$b$ (step S11$c$).

In a case of the processing unit which has not requested the longest standby time, the control unit 11 retrieves the longest standby time 11$c$ equal to the requested longest standby time in the mode management table 11$b$, adds information for identifying the processing unit which has transmitted the request to the processing unit information 11$f$ associated with the retrieved longest standby time 11$c$, and stores the mode management table 11$b$ added with the information. In addition to the request, when information showing the use form of the processing unit which has transmitted the request, the control unit 11 also adds the use form to the processing unit information 11$f$ (step S11$d$).

The processing unit information 11$f$ exemplified in FIG. 2 shows a status in which the contents reproducing unit 21 requests the longest standby time of 0 second so as to operate the use form of the contents reproduction, and the control unit 11 stores the request.

The processing unit information 11$f$ exemplified in FIG. 3 shows a status in which the contents reproducing unit 21 requests the longest standby time of 0 second so as to operate the use form of the contents reproduction (where the status at this time is exemplified in FIG. 2), the still image decoder 22 requests the longest standby time of 5 seconds (or the implicit value), and the control unit 11 stores the request.

Sequentially, the control unit 11 determines the using longest standby time (step S11$e$) and terminates the operation of determining the longest standby time (step S11$f$). The operation of determining the longest standby time will be described below.

In the case of the processing unit which has already made the request in step S11$c$, the control unit 11 retrieves the processing unit information 11$f$ equal to the information identifying the processing unit which has transmitted the request from the mode management table 11$b$. In addition, the control unit 11 deletes information which is contained in the processing unit information 11$f$ associated with the retrieved processing unit 11$f$ information and identifies the processing unit which has transmitted the request. In this case, the information showing the use form of the processing unit is also contained in the deleted information.

The processing unit information 11$f$ is updated in a manner of adding information for identifying the processing unit which transmits a request to the processing unit information 11$f$ associated with the longest standby time 11$c$ equal to the requested longest standby time, and then the updated mode management table 11$b$ is stored (step S11$g$) to determine the longest standby time in step S11$e$. Moreover, in addition to the request, when information showing the use form of the processing unit which has transmitted the request is received, the control unit 11 adds the use form to the processing unit information 11$f$.

The processing unit information 11$f$ exemplified in FIG. 4 shows a status in which the contents reproducing unit 21 requests the longest standby time of 0 second so as to operate the use form of the contents reproduction (where the status at this time is exemplified in FIG. 2), the still image decoder 22 requests the longest standby time of 5 seconds (or the implicit value) (where the status at this time is exemplified in FIG. 3), the contents reproducing unit 21 requests the longest standby time of 10 seconds so as to operate the use form of the fast forward, and the control unit 11 stores the request.

Meanwhile, when it is determined that the notification informing the use termination in step S11$b$ has been received, the control unit 11 retrieves the processing unit information 11$f$ equal to the information for identifying the processing unit which has transmitted the request from the mode management table 11$b$; deletes the information for identifying the processing unit which has transmitted the request contained in the retrieved processing unit information 11$f$; stores the mode management table 11b in which the information is deleted (step S11h); and transfers the operation to determine the longest standby time in step S11e. Information showing the use form of the processing unit is contained in the deleted information.

The operation of determining the longest standby time in step S11e will be described. The control unit 11 retrieves the processing unit information 11f storing the information from the mode management table 11b. When the processing unit information 11f does not exist (0 item) by the retrieve, the control unit 11 determines that the longest standby time is 0 second. That is because any processing unit does not use the external storage portion.

In a case where any processing unit does not use the external storage portion, the longest standby time is worthless, and thus the control unit 11 does not require determining the longest standby time. However, when the operation of step S11e is performed through the step S11h, that is, the processing unit using the external storage portion has been present, but it is not present any longer, the power supply to the external storage portion can be immediately stopped by determining the longest standby time to 0 second. Moreover, the control unit 11 can immediately stop the power supply to the external storage portion regardless of determination of the longest standby time.

Next, an operation in which the retrieved processing unit information 11f is 1 item will be described. The control unit 11 obtains the longest standby time 11c associated with the retrieved processing unit information 11f. In addition, the control unit 11 determines the obtained longest standby time 11c as the longest standby time which the control unit 11 use.

Next, an operation in which the retrieved processing unit information 11f is plural will be described. The control unit 11 obtains the longest standby time 11c associated with the retrieved processing unit information 11f, the priority 11d, the weight 11e, and the number of the processing units stored in the processing unit information 11f. In addition, the control unit 11 determines the longest standby time from the obtained information in the following manner.

First, among the plurality of obtained priorities 11d, the smallest number, that is, a higher priority is obtained. The longest standby time 11c associated with the obtained priority 11d is determined as the longest standby time which the control unit 11 uses. That is because the longest standby time 11c associated with the higher priority (the priority lid with the smaller number) is more preferable in terms of efficiency of the entire apparatus.

Second, among the obtained longest standby times 11c, the control unit 11 determines the longest standby time having the smallest value as the longest standby time which the control unit 11 uses. That is because the largest power consumption reduction can be expected. Third, among the obtained longest standby times 11c, the longest standby time having the largest value is determined as the longest standby time which the control unit 11 uses. That is because the response of the apparatus can be improved most.

Fourth, the control unit 11 calculates an average value of the obtained longest standby times 11c. In addition, the calculated value is determined as the longest standby time which the control unit 11 uses. At this time, upon calculating the average value, the weight may be placed on each of the longest standby times 11c to calculate the average value with the weight. The weight is one of the following descriptions or a plurality thereof. That is, a weight is the weight 11e associated with each of the longest standby times 11c. In addition, the weight is the number of the processing units stored in the processing unit information 11f associated with each of the longest standby times 11c.

The weight is a reciprocal number of the priority 11d associated with each of the longest standby time 11c. That is, as the priority 11d is smaller, that is, the priority is higher, higher weight is given. In addition, every processing unit has an important level (not shown) and the weight is the importance level stored in the processing unit information 11f associated with each of the longest standby time 11c. In this case, the important level of the processing unit may be stored in the processing unit, may be stored in the control unit 11, or may be stored in the storage unit 11a.

Fifth, among the important levels stored in the processing unit information 11f associated with the longest standby times 11c, the most important level is obtained. In addition, the control unit 11 determines the longest standby time 11c associated with the processing unit information 11f in which the obtained processing unit is contained as the longest standby time which the control unit 11 uses.

In this case, the important level of the processing unit may dynamically vary. For example, the control unit 11 assumes that the processing unit starting later has the more important level. That is because a user is interested in the processing unit starting later. In addition, it is assumed the processing unit using the display unit 15 or a display screen broader than that of the display unit 15 has the more important level. That is because the operation of the processing unit enables the user to feel the response of the apparatus more sensitively.

The above-described operation of determining the longest standby time is not necessarily exclusive. The control unit 11 may appropriately combine the operations. In addition, the information which the control unit 11 does not use may not be stored in the mode management table 11b.

Next, an operation in which the control unit 11 determines the longest standby time and in which the longest standby time is determined by the status where the external storage medium connection unit 23 and the like is used or not and the state where the electrical power is supplied to the external storage portion or not, that is, the status of the external storage portion will be described.

Figure 6:
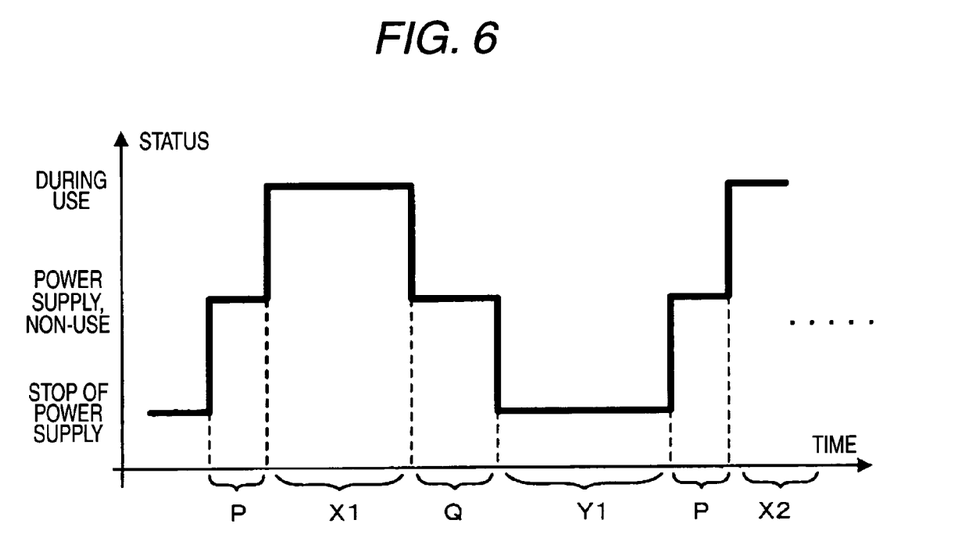
FIG. 6 is an exemplary diagram illustrating a first example of a status of an external storage medium connecting unit and the like according to the embodiment.

FIG. 6 is a diagram illustrating such status. A vertical axis represents statuses. In addition, the status of the external storage portion is one of 3 statuses: a status where the power supply is stopped, and thus naturally it is not used, a status where the electrical power is supplied, but it is not operated or not used, a status where it is being used, the electrical power is supplied, and naturally is being operated. The external storage portion are transmitted from one of these statuses to another status. In addition, a horizontal axis represents a period of time.

In a state where the power supply is stopped, electrical power has been supplied to the external storage portion for an activation period of time P from some time, but a status where an operation is not possible continues. This activation period of time P is a period of time from the power supply to time when the operation is possible. Afterward, the external storage portion have been used for a use period of time X1, and then the electrical power has been supplied for a longest standby time Q. However, the operation is possible, but the status where it is not used continues. The longest standby time Q is the longest standby time which has determined by the control unit 11.

Since the external storage portion has not been used until the longest standby time Q elapses, the control unit 11 stops the power supply after the longest standby time. Consequently, a power supply stop period of time Y1 elapses. Then, electrical power has been supplied to the external storage portion for the activation period of time P, but it experiences the status where it cannot be operated. Afterward, it has been used for a use period of time X2. Such operations are reiterated.

In the statuses shown in FIG. 6, the external storage portion has not been used for the longest standby time Q. Consequently, the control unit 11 can determine the longest standby time Q to be shorter, for example, 0 second. Such determination is based on the fact that the power consumption reduction is possible without deteriorating the response of the apparatus.

In particular, when a sum of the longest standby time Q and the power supply stop period of time Yi (where i is a natural number of 1 or more, and hereinafter, a description about i taking values is omitted) is larger than the activation period of time P, the longest standby time Q is determined to be shorter, for example, 0 second. There is rarely a possibility of deteriorating the response of the apparatus due to such determination.

When a use period of time Xi is larger than the activation period of time P, the possibility of deteriorating the response of the apparatus is particularly low. In this case, that is because it is considered that the processing unit using the external storage portion reads a large amount of information once to the buffer storage by performing a sequential reading operation. For example, such case may be the above-mentioned status where the contents reproducing unit 21 performs the reproduction operation.

Alternatively, when the power supply stop period of time Yi is substantially equal to the activation period of time P, the control unit 11 makes the longest standby time Q longer, for example, set the power supply stop period of time Yi to 0 second by adding an absolute value (|the power supply stop period of time Yi−the activation period of time P|) of a difference between the power supply stop period of time Yi and the activation period of time P. The determination of the longest standby time Q enables the response of the apparatus to be improved.

In particular, when the power supply stop period of time Yi is equal to or less than the activation period of time P (the power supply stop period of time Yi≦the activation period of time P), the control unit 11 makes the longest standby time Q longer to improve the response of the apparatus, and the power consumption is also reduced. That is because the reduction in the power consumption for the activation period of time P results in reduction in the power consumption even though the power consumption is increased for a difference period of time between the power supply stop period of time Yi and the activation period of time P (the activation period of time P−the power supply stop period of time Yi).

Figure 7:
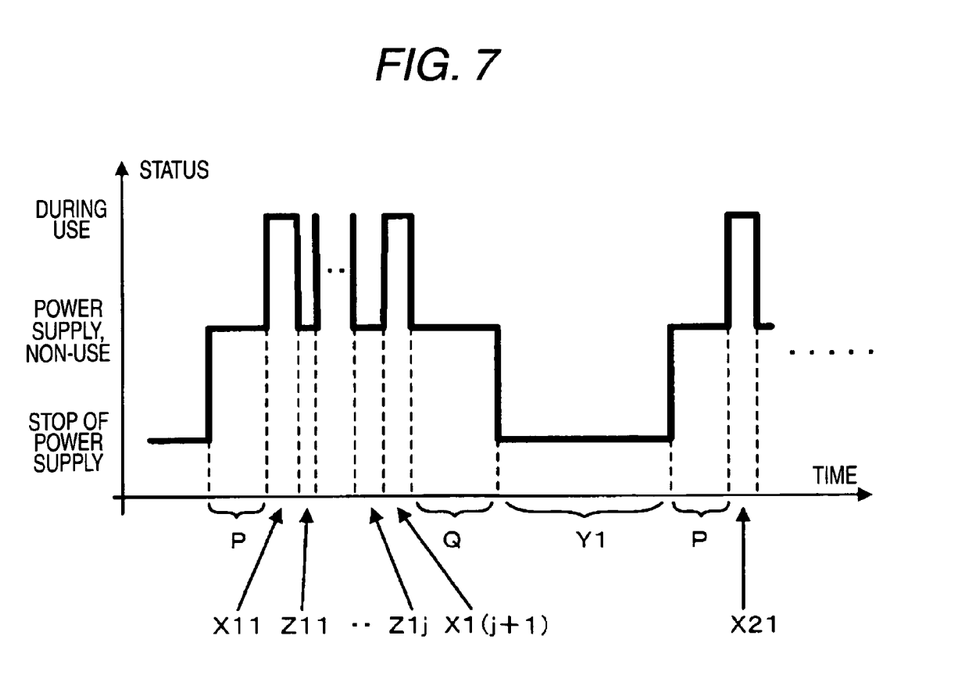
FIG. 7 is an exemplary diagram illustrating a second example of the status of the external storage medium connecting unit and the like according to the embodiment.

FIG. 7 is a diagram illustrating another example of the status where the external storage portion is used and the status where electrical power is supplied to the external storage portion. The activation period of time P and the longest standby time Q which are presented by a vertical axis and a horizontal axis, respectively, are the same as those described with reference to FIG. 6. Accordingly, the description is omitted.

After the power supply to the external storage portion is stopped, an activation period of P has elapsed from some time. The external storage portion have been used for a use period of time X11 and have been supplied with electrical power for a standby period of time Z11 so as to be operated. However, non-use status continues. The standby period of time Z11 is less than a longest standby time Q and the external storage portion have been used before stop of the power supply.

The use and standby period of times are reiterated. The external storage portion has been used for a use period of time X1 (j+1) after a standby period of time Z1j. Afterward, the longest standby time Q is elapsed and the power supply stop period of time Y1 is elapsed (where j is a natural number of 1 or more, and hereinafter, description about j taking values which can take is omitted). Likewise, reiteration of the use and standby period of times and the stop of the power supply are alternated.

The control unit 11 evaluates the length of the standby period of time Zij. When the standby period of time Zij is small, continuous power supply for the longest standby time Q after the use termination is determined to be effective. Consequently, it is determined that change in the longest standby time Q is not necessary.

In particular, when the standby period of time Zij is less than the activation period of time P (the standby period of time Zij≦the activation period of time P), it is apparent that the continuous power supply for the longest standby time Q after the use termination is effective. That is because in a case where the power supply is stopped during the standby period of time Zij, the response of the apparatus deteriorates since the activation period of time P is necessary for the next use and because the power consumption during the activation period of time P causes increase in the power consumption.

On the other hand, when the standby period of time Zij is at least larger than the activation period of time P, the longest standby time Q is determined to a value equal to or less than a difference (the standby period of time Zij−the activation period of time P) between the standby period of time Zij and the activation period of time P, for example, 0 second, the power supply is stopped during the standby period of time Zij. Consequently, it is possible to reduce the power supply between the use period of time Xij before the standby period of time Zij and the next period of time Xi (j+1). However, the response of the apparatus deteriorates in correspondence to the necessity of the activation period of time P before start of the next use period of time Xi (j+1). In this case, the control unit 11 may set the longest standby time Q to a less value or not.

The control unit 11 compares the standby period of time Zij with the longest standby time Q. In this case, the standby period of time Zij is equal to or less than the longest standby time Q (the standby period of time Zij<the longest standby time Q). In a state where a difference between the standby period of time Zij and the longest standby time Q is small, when the longest standby time Q is determined to a value less than the standby period of time Zij, the power supply during the standby period of time Zij is stopped. Consequently, the power supply reduction is possible. However, the response of the apparatus deteriorates in correspondence to the necessity of the activation period of time P before start of the nest use period of time Xi (j+1). In this case, the control unit 11 may set the longest standby time Q to a less value or not.

An operation of determining the longest standby time Q of the control unit 11 which depends on a magnitude relation of the longest standby time Q and the power supply stop period of time Yi and an operation of determining the longest standby time Q of the control unit 11 which depends on the magnitude relation of the power supply stop period of time Yi and the activation period of time P are the same as those described with reference to FIG. 6. Accordingly, the description is omitted.

According to the foregoing description, the determination of the control unit 11 at some time and the determination at another time may be different. That is, appropriate determination during a short period of time may be not made. The control unit 11 determines the longest standby time Q by grasping the status during a period of time when the processing unit is determined to operate. In addition, both statuses of the example described with reference to FIG. 6 and another example described with reference to FIG. 7 may be generated. In addition to both the statuses, the control unit 11 determines the longest standby time Q.

The determination of the longest standby time Q to obtain the power consumption reduction by the control unit 11 may be contrary to the determination of the longest standby time Q to improve the response of the apparatus. In this case, the control unit 11 determines the longest standby time Q so as to obtain one effect thereof. However, according to other statuses of the apparatus, selection of desirable effect may be determined.

For example, when an amount of electrical power stored in a battery 24 is less than a threshold value, the control unit 11 performs the process of reducing power consumption. Alternatively, when the amount of electrical power is more than the threshold value, a process of improving the response of the apparatus is performed. In addition, when the important level of the processing unit using the external storage portion is higher, the process of improving the response of the apparatus is performed. Alternatively, when the important level is lower, the process of reducing the power consumption is performed.

As described above, the content reproducing unit 21 and the still image decoder 22 request the longest standby time to the control unit 11 and the time is a certain value contained in the longest standby time 11c of the mode management table 11b. However, the invention is not limited thereto. An arbitrary value may be request. In this case, in the mode management table 11b, the weight 11d and the priority 11e may be stored every range of a request value and the control unit 11 may perform the above-described operations.

The request for the longest standby time is not a value, but may be one of levels. For example, any one of "long", "middle", "short", and the like may be used. In this case, correspondence with the request level and the longest standby time 11c are stored in the mode management table 11b. In addition, the control unit 11 can perform the above-described operations by converting the level representing the request time into the longest standby time 11c according to the correspondence.

According to the process of treating the request for the longest standby time by one of the levels, for example, a plurality of the correspondences is stored. In addition, the control unit 11 may individually use such correspondences by classifying the device which is the power consumption reduction target or may use the correspondences by classifying the device according to, for example, the amount of electrical power charged in the battery 24.

The contents reproducing unit 21 and the still image decoder 22 do not refer to status of another portion of the apparatus and the control unit 11 may determine the appropriate longest standby time according to the specification or specification change of the device which is the power consumption reduction target or according to the amount of the electrical power charged in the battery 24, regardless of the request for a normally predetermined longest standby time.

Furthermore, the contents reproducing unit 21 and the still image decoder 22 may not request the longest standby time to the control unit 11. In this case, correspondence with the request longest standby time is stored in the storage unit 11a in every contents reproducing unit 21 and still image decoder 22 and the control unit 11 obtains the longest standby time requested with reference to the correspondence.

The control unit 11 may configure the requested longest standby time to an implicit value and may determine the longest standby time in accordance with the status where the external storage portion is used and the status where electrical power is supplied to the external storage portion 23 and the like, as described with reference to FIGS. 6 and 7.

In the foregoing description, the device which is the power consumption reduction target has been described as an example of the external storage portion, but the invention is not limited thereto. The same holds true for all devices. In a case where the device which is the power consumption reduction target is the display unit 15, it is assumed that the display unit 15 is being used when the processing unit changes display contents in accordance with a user operation. For example, a display of video contents may be exemplified. On the other hand, in a case of a supplementary display, it is assumed that the display unit 15 is not being used even though the display contents vary. A display of predetermined picture images upon playing voice contents or a display of time from a play start may be exemplified. In addition, a display of time upon display a standby display may be exemplified.

According to the above-mentioned embodiments, it is possible to appropriately control a predetermined period of time in a case where reduction in power consumption is performed while a device is not being used for the predetermined period of time.

The above-mentioned embodiments have been described with reference to the cellular phone, but the invention is not limited thereto. The invention may be applied to all information processing apparatuses in addition to the contents reproducing apparatus. The invention is not limited to the above-described structure, but may be modified in various forms.

Also, above-mentioned embodiments describes that the power supply to the external storage portion is terminated when the longest standby time has been elapsed, however, it can be acceptable the power supply to the external storage portion is reduced to a predetermined voltage.

What is claimed is:
1. An information processing apparatus comprising:
a battery;
a first module configured to operate based on the electrical power supplied from the battery;
a second module configured to access the first module to execute processing;
a memory configured to store a table containing standby time and information identifying the second module; and
a controller configured to control power supply to the first module;
wherein the controller terminates the power supply to the first module if the controller fails to detect access to the first module from the second module and the standby time has elapsed from a previous access, and
wherein the controller determines a standby time with respect to the first module in response to a request from the second module and stores the standby time in the memory.

2. An information processing apparatus comprising:
a battery;
a first module configured to operate based on the electrical power supplied from the battery;
a plurality of second modules configured to access the first module to execute processing;

a memory configured to store a table containing standby time and information identifying the plurality of second modules; and a controller configured to control power supply to the first module;

wherein the controller determines valid standby time if a plurality of standby time is contained in the table, and terminates the power supply to the first module if the controller fails to detect access to the first module from one of the second modules and the valid standby time has elapsed from a previous access, and wherein the controller determines a standby time with respect to the first module in response to a request from one of the second modules and stores the standby time in the memory.

3. The information processing apparatus according to claim 2, wherein the table further contains priority information; and the controller determines the valid standby time based on the priority information.

4. The information processing apparatus according to claim 2, wherein the first module is an external storage device.

5. The information processing apparatus according to claim 2, wherein the controller decides the longest standby time as the valid standby time.

6. The information processing apparatus according to claim 2, wherein the controller calculates average standby time of the plurality of standby time and decides the average standby time as the valid standby time.

7. The information processing apparatus according to claim 2, wherein the table further containing weighting information; and the controller calculates average standby time by averaging the sum of standby time and weighting information for all entry.

8. A cellular phone comprising:

an interface configured to communicate radio signal with a base station;

a battery;

a first module configured to operate based on the electrical power supplied from the battery;

a plurality of second modules configured to access the first module to execute processing;

a memory configured to store a table containing standby time and information identifying the plurality of second modules; and a controller configured to control power supply to the first module;

wherein the controller determines valid standby time if a plurality of standby time is contained in the table, and terminates the power supply to the first module if the controller fails to detect access to the first module from one of the second modules and the valid standby time has elapsed from a previous access, and wherein the controller determines a standby time with respect to the first module in response to a request from one of the second modules and stores the standby time in the memory.

9. The cellular phone according to claim 8, wherein the table further contains priority information; and the controller determines the valid standby time based on the priority information.

10. The cellular phone according to claim 8, wherein the first module is an external storage device.

11. The cellular phone according to claim 8, wherein the controller decides the longest standby time as the valid standby time.

12. The cellular phone according to claim 8, wherein the controller calculates average standby time of the plurality of standby time and decides the average standby time as the valid standby time.

13. The cellular phone according to claim 8, wherein the table further containing weighting information; and the controller calculates average standby time by averaging the sum of standby time and weighting information for all entry.

* * * * *